J. H. NEAL.
SAFETY DEVICE FOR AUTOMOBILES.
APPLICATION FILED MAY 3, 1916.
1,200,752.
Patented Oct. 10, 1916.
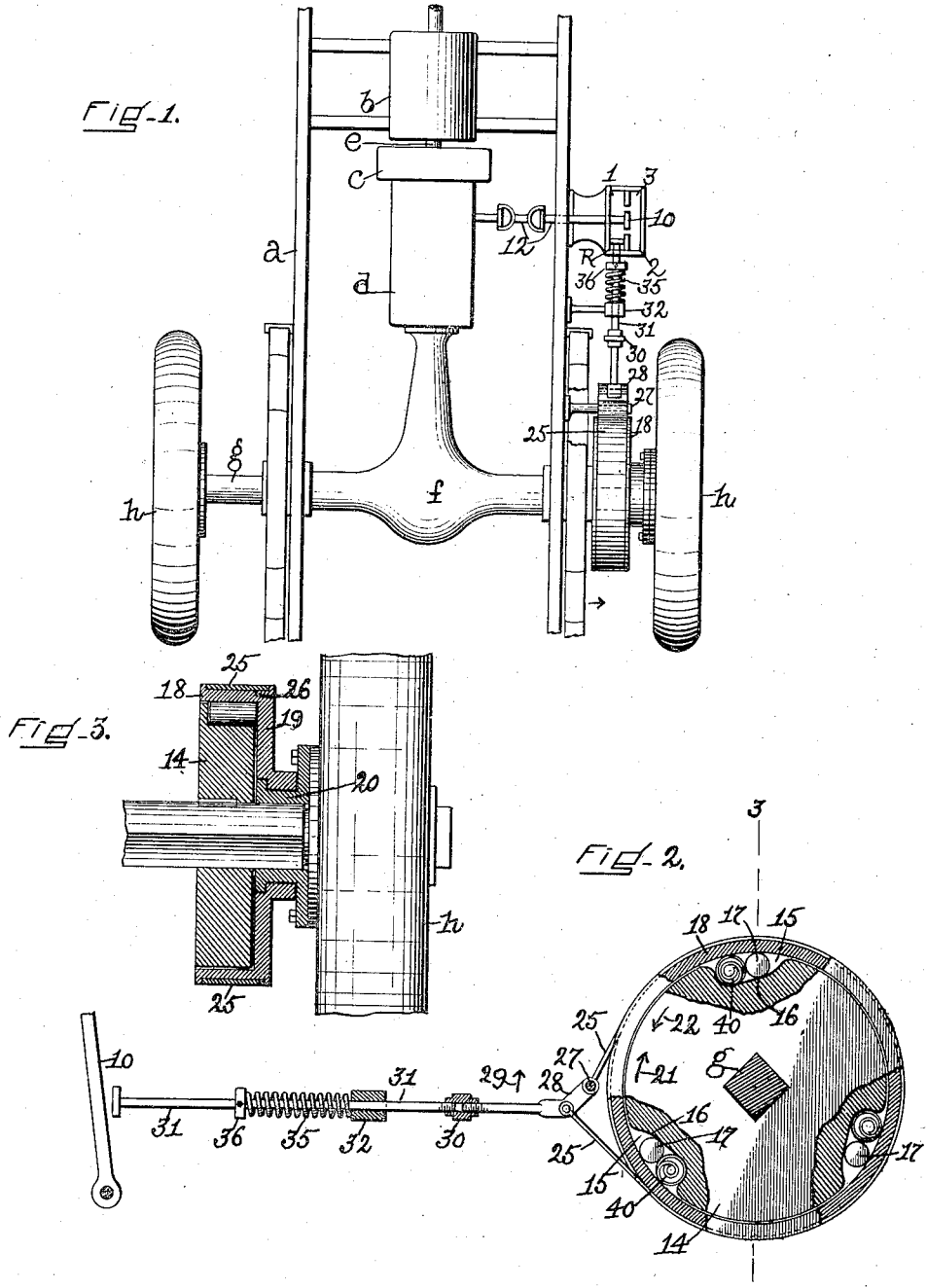

UNITED STATES PATENT OFFICE.

JAMES H. NEAL, OF CAMBRIDGE, MASSACHUSETTS.

SAFETY DEVICE FOR AUTOMOBILES.

1,200,752. Specification of Letters Patent. Patented Oct. 10, 1916.

Application filed May 3, 1916. Serial No. 95,227.

*To all whom it may concern:*

Be it known that I, JAMES H. NEAL, a citizen of the United States, residing in Cambridge, in the county of Middlesex and State of Massachusetts, have invented an Improvement in Safety Devices for Automobiles, of which the following description, in connection with the accompanying drawings, is a specification, like characters on the drawings representing like parts.

This invention relates to motor vehicles provided with wheels, and such, for instance, as the ordinary motor vehicle now in common use, and has for its object to provide such motor vehicles with a safety device for arresting unexpected or undesired reverse movement of the vehicle, and which has provision for avoiding accidents to the safety device itself or to parts of the vehicle, by a too sudden application of the safety device under conditions as will be described, the said safety device coöperating with the reversing mechanism of the vehicle so as to be rendered inoperative at the will of the operator when it is desired to reverse the vehicle.

The particular features of the invention will be pointed out in the claims at the end of this specification.

Figure 1 represents in plan a sufficient portion of the chassis and operating parts of an automobile provided with a safety device embodying this invention. Fig. 2, a detail in section and elevation of the safety device shown in Fig. 1, and Fig. 3, a detail in section on the line 3—3, Fig. 2, showing also a portion of the wheel.

In Fig. 1, is conventionally represented a sufficient portion of an automobile of usual or known construction, which is provided with one form of safety device embodying this invention.

Referring to Fig. 1, *a* represents the chassis; *b* the prime mover, which may be a gasolene engine or an electric motor or the like; *c* the casing or box containing the usual clutch (not shown); *d* the box or casing containing the usual transmission gearing (not shown), but which transmits motion of the motor shaft *e* to the driving shaft (not shown), which is connected by the differential gearing (not shown) contained in the housing *f*, with the rear axles *g* having the rear wheels *h* fast on them to rotate therewith.

The vehicle herein represented is provided with a transmission of the selective type, which is of well-known construction and has an operating or control lever 10, capable of being moved into four different positions marked 1, 2, 3, and R, signifying low speed, second speed, high speed and reverse respectively, the lever 10 being operatively joined with the transmission by a connection 12 of known construction.

The present invention has for its object to provide the vehicle with a safety device which is constructed to operate in one direction or way only, to arrest unexpected or undesired reverse movement of the vehicle, but which is also constructed and arranged to enable it to be rendered inoperative when the control lever 10 is moved into its reversing position, and is further constructed and arranged to avoid damage to the safety device by a too sudden stopping of the vehicle, especially when the latter is heavy or heavily loaded.

The safety device may be applied to the driving mechanism of the vehicle at the rear of the clutch, and in the present instance I have shown it as mounted on one of the rear axles *g*.

The safety device herein shown is provided with a member 14 fast on the rear axle *g*, which member is shown as disk provided with a plurality of recesses 15 in its periphery, said recesses having inclined bottom walls 16.

The recesses 15 contain clutch rollers 17, which coöperate with a member, shown as a rim 18 on a disk 19, which is loosely mounted on a hub 20 fast on the shaft or axle *g*. The rim 18 is designed to be free from the disk 14, when the vehicle is moving in a forward direction, in which the disk turns in the direction indicated by the arrow 21, Fig. 2, but is designed to be clutched to the disk when the latter is rotated in the opposite direction indicated by the arrow 22, and if the rotation of the disk in the direction of the arrow 22 is desired or expected, as when the operator desires to reverse the direction of movement of the vehicle, then provision is made for permitting the rim 18 to move with the disk 14, but if the rotation in the direction of the arrow 22 is unexpected or undesired, then the rim 18 is held or prevented from moving with the disk 14 except for a limited distance as will be described. For this purpose provision is made for holding the member or rim 18 from rotation under ordinary or normal conditions of use as will be described, and also for permitting a limited slipping movement of the member or rim 18 under abnormal conditions. In the present instance I have shown one construction or arrangement for accomplishing this result, and to this end the rim 18 has coöperating with it a brake band or strap 25, which engages the rim 18 and is preferably located in an annular groove 26 in said rim, and has one end anchored to a stationary pin 27 and has its other end connected with a lever 28, which is pivoted upon the pin 27, so that when the lever 28 is turned on the pin 27 in the direction indicated by the arrow 29, Fig. 2, the band or strap 25 is tightened upon the rim 18 so as to hold the same against movement, when the disk 14 is clutched to the rim by rotation of the disk in the direction indicated by the arrow 22. When the lever 28 is moved in the direction opposite to that indicated by the arrow 29, the band 25 is slackened upon the rim 18, and the latter is free to rotate with the disk 14 in the direction indicated by the arrow 22, and it is designed that this latter relation of the rim 18 to the band 25 should exist when the operator throws the transmission in reverse, that is, when he moves the operating or control lever 10 into the position marked R in Fig. 1. To this end, provision is made for causing the operating lever 10 to move the lever 28 so as to slacken the band 25, and in the present instance, the lever 28 is connected by an adjustable sleeve 30 to a rod 31, which is movable in a suitable bearing 32 and has its front end located so as to be engaged by the control lever 10, when the latter is moved into its reversing position, marked R in Fig. 1. It will thus be seen that when the control lever 10 is moved into its reversing position, it will move the lever 28 so as to slacken the band 25, and allow the rim 18 to move freely with the disk 14 in the direction indicated by the arrow 22. The brake band 25 is caused to grip the rim 18 and hold it stationary under normal conditions, by a spring 35 encircling the rod 31 between the bearing 32 and a collar 36 on said rod. The brake band 25 forms one form of friction grip or clutch for the rim, and its grip is such that under ordinary or normal conditions of use, it will hold the loose member or rim 18 stationary, and thereby arrest unexpected or undesired reverse rotation of the disk 14, as soon as the latter has been turned sufficiently in the direction of the arrow 22 to wedge the clutch roller 17 between the inclined bottom of its socket 15 and the rim 18, but such friction grip of the band with the rim allows a limited or initial slip or movement of the rim 18 and the disk 14 clutched thereto, when the disk 14 is clutched to the rim 18 under the influence of a heavy vehicle or a heavy load on the vehicle, especially on a steep incline.

Under such conditions of use, the initial shock occasioned by the sudden coupling of the disk 14 with the rim 18 will effect a slipping movement of the rim with relation to the clutch or brake band 25 until the initial shock has been dissipated, whereupon the friction grip of the band upon the rim 18 will prevail and hold the latter stationary. This slipping feature of the safety device avoids breakage or damage to the latter and thereby insures the proper operation of the safety device under abnormal or severe conditions of use.

The clutch rollers 17 may be held in a substantially central position in their sockets by springs 40, so that the rollers are normally in such position, that a slight rotation of the disk in the direction of the arrow 22 will cause them to clutch the disk 14 to the rim 18, the said springs permitting the rollers to be moved out of contact with the rim when the disk is rotated in the forward direction indicated by the arrow 21.

The operation of the safety device herein shown may be briefly described as follows:— While the control lever 10 is in neutral or any one of the forward positions marked 1, 2, and 3, the said lever is out of engagement with the rod 31 and the latter and the lever 28 are placed under the influence of the spring 35, which turns the lever 28 so as to tighten up on the band 25 and cause the latter to grip the rim 18 and hold it stationary against movement. Assume that the vehicle is proceeding up a hill and the engine or motor should become inoperative for any cause, or that the vehicle is standing still or on an incline and the usual brakes should fail to hold, and that under these conditions the vehicle should begin to move backward. As soon as the disk 14 has been rotated in the direction of the arrow 22 to cause the rollers 17 to become wedged between the disk and rim 18, the latter being stationary will hold the vehicle from further movement in the reverse direction, and accidents from this source are therefore avoided. If the vehicle should be heavily loaded, the initial shock caused by the wedging of the rollers 17 might be sufficient to break some part of the safety device if provision were not made for relieving the parts from such shock or strain, which is accomplished in the present construction by providing for a slipping movement of the rim 18 in the brake band 25, which allows the said rim to move with the disk 14 until the initial shock is overcome or dissipated, whereupon the rim and disk are held by the band from further reverse movement. When the vehicle is moving in a forward direction, the disk 14 rotates in the direction of the arrow 21 and the rollers are moved backward in their sockets against the action of the springs 40, thereby unclutching the disk 14 from the stationary rim 18.

I have herein shown one construction of safety device, which is operative in one direction only to automatically arrest unexpected or undesired reverse movement of the vehicle and has provision fur permitting a limited reverse movement under abnormal conditions, but it is not desired to limit the invention to the particular construction shown.

Claims:

1. The combination with a rotatable member of a motor vehicle having wheels, of a safety device coöperating with said rotatable member and provided with a member fast to said rotatable member to rotate therewith in opposite directions, and with means coöperating with said fast member to permit the latter to rotate freely in a forward direction and to automatically arrest unexpected or undesired continued movement of the said fast member and of the vehicle in the reverse or opposite direction under normal conditions, said means being constructed and arranged for permitting a limited unexpected reverse movement of said fast member after the latter and its coöperating means have been brought into operative relation, to thereby avoid damage to said safety device under said abnormal conditions.

2. The combination with a rotatable member of a motor vehicle having wheels, of a safety device coöperating therewith and provided with a member fast to said rotatable member to rotate therewith, means coöperating with said member for arresting continued unexpected reverse movement of said rotatable member under normal conditions, and means for permitting a limited unexpected reverse movement of said fast member under abnormal conditions and after said arresting means and said rotatable member have been brought into operative relation.

3. The combination with a rotatable member of a motor vehicle having wheels and provided with a device for controlling movement of said vehicle, of a safety device coöperating with said vehicle and provided with a member fast to said rotatable member to rotate therewith, means for arresting continued unexpected reverse movement of said rotatable member under normal conditions, and means for permitting a limited unexpected reverse movement of said fast member under abnormal conditions, said safety device coöperating with said controlling device to be rendered inoperative to arrest reverse movement of the vehicle at the will of the operator.

4. The combination with a rotatable member of a motor vehicle having wheels, of a safety device coöperating therewith and provided with a member fast to said rotatable member to rotate therewith, a member coöperating with said fast member and normally loose with relation thereto, means for coupling said loose member with said fast member, a brake band coöperating with said loose member to normally hold it stationary and arrest unexpected reverse rotation of the fast member when the latter member is coupled thereto under normal conditions and to permit a limited movement of both members with relation to said band under abnormal conditions.

5. The combination with a rotatable member of a motor vehicle having wheels and provided with a device for controlling movement of said vehicle, of a safety device coöperating with said rotatable member and provided with a member fast to said rotatable member to rotate therewith, a member coöperating with said rotatable member and normally loose with relation thereto, a clutch roller interposed between said members, and a brake band coöperating with said normally loose member to normally hold the latter stationary while said fast member is rotated in a forward direction.

In testimony whereof I have signed my name to this specification.

JAMES H. NEAL.